(12) United States Patent
Yamanaka

(10) Patent No.: US 7,982,828 B2
(45) Date of Patent: Jul. 19, 2011

(54) POLARIZATION SWITCHING LIQUID CRYSTAL ELEMENT AND IMAGE DISPLAY APPARATUS HAVING THE SAME

(75) Inventor: Kazuya Yamanaka, Hachioji (JP)

(73) Assignee: Olympus Corporation, Tokyo (JP)

( * ) Notice: Subject to any disclaimer, the term of this patent is extended or adjusted under 35 U.S.C. 154(b) by 743 days.

(21) Appl. No.: 12/111,390

(22) Filed: Apr. 29, 2008

(65) Prior Publication Data

US 2008/0225187 A1    Sep. 18, 2008

Related U.S. Application Data

(63) Continuation of application No. PCT/JP2006/316426, filed on Aug. 22, 2006.

(30) Foreign Application Priority Data

Oct. 31, 2005    (JP) ................ 2005-316864

(51) Int. Cl.
  *G02F 1/1335*    (2006.01)
  *G02F 1/13*    (2006.01)

(52) U.S. Cl. ......... 349/96; 349/177; 349/178; 349/189; 349/181; 349/186; 349/194; 349/201

(58) Field of Classification Search ............ 349/96, 349/18, 177, 178, 189, 180, 181, 194, 201
See application file for complete search history.

(56) References Cited

U.S. PATENT DOCUMENTS

| | | | |
|---|---|---|---|
| 5,659,411 A | | 8/1997 | Nito et al. |
| 6,191,833 B1 * | | 2/2001 | Hirakata ............ 349/61 |
| 6,690,346 B1 | | 2/2004 | Hanano |
| 7,012,662 B2 * | | 3/2006 | Kim et al. ............ 349/114 |
| 7,535,528 B2 * | | 5/2009 | Kubo et al. ............ 349/114 |
| 2004/0201814 A1 | | 10/2004 | Yamamoto |

FOREIGN PATENT DOCUMENTS

| | | |
|---|---|---|
| JP | 6-347802 | 12/1994 |
| JP | 070064048 | 3/1995 |
| JP | 11296135 | 10/1999 |
| JP | 2004-233990 | 8/2004 |

OTHER PUBLICATIONS

C.H. Gooch, et al., The optical properties of twisted nematic liquid crystal structures with twist angles [less than] 90 [degrees]; J. Phys. D: Appl. Phys., vol. 8, 1975, pp. 1575-1584, Great Britain.

* cited by examiner

*Primary Examiner* — Julie-Huyen L Ngo
(74) *Attorney, Agent, or Firm* — Volpe and Koenig P.C.

(57) ABSTRACT

The present invention provides a polarization switching liquid crystal element 1 having TN liquid crystal 7 retained between two transparent substrates 2a and 2b for transmitting at least visible polarized light with the polarized light transmission axis selectively rotated by 90 degrees when a voltage is selectively applied to the TN liquid crystal 7, wherein a phase difference u of said TN liquid crystal 7 is defined by the following equation: $u=2\times\Delta n\times d/\lambda$, where $\Delta n$ is the refractive index anisotropy of said TN liquid crystal 7, d is the thickness of said TN liquid crystal 7, and $\lambda$ is the wavelength of said polarized light, and a transmittance T of said polarization switching liquid crystal element measured with polarization plates on the incident and outgoing sides is defined by the following equation: $T=(1/2)\times\sin^2\{\pi(1+u^2)^{1/2}/2\}/(1+u^2)$, and wherein the phase difference u includes a value 1.7 and the transmittance T is 0.1 or lower when the $\lambda$ ranges from 400 nm to 700 nm. Then, a polarization switching liquid crystal element having a high response speed and reduced wavelength-dependency can be realized using inexpensive and highly durable TN liquid crystal without increasing parts cost.

14 Claims, 15 Drawing Sheets

$$T = \frac{1}{2} \times \frac{\sin^2(\pi/2 \times \sqrt{(1+u^2)})}{1+u^2}, \quad u = \frac{2 \times \Delta n \times d}{\lambda}$$

FIG. 12
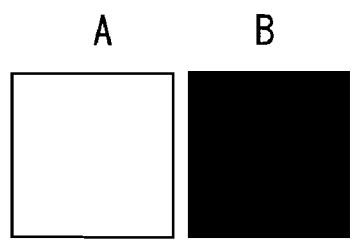
FIG. 13
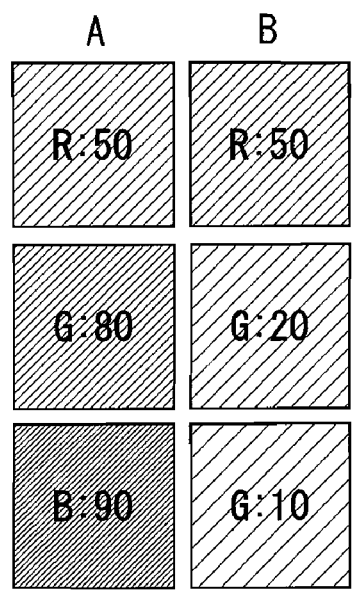
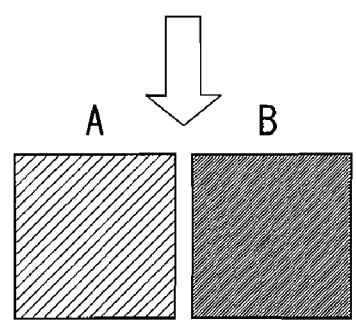

POLARIZATION SWITCHING LIQUID CRYSTAL ELEMENT AND IMAGE DISPLAY APPARATUS HAVING THE SAME

CROSS-REFERENCE TO RELATED APPLICATION

The present application is a Continuing Application based on International Application PCT/JP2006/316426 filed on Aug. 22, 2006, which, in turn, claims the priority from Japanese Patent Application No. 2005-316864 filed on Oct. 31, 2005, the entire disclosure of these earlier applications being herein incorporated by reference.

TECHNICAL FIELD

The present invention relates to a polarization switching liquid crystal element and an image display apparatus, such as a projector, having the same.

BACKGROUND OF THE INVENTION

Many liquid crystal elements are used in display applications. Many liquid crystal elements in display applications realize a gradation display, not a two-grade, black and white display. In addition, various techniques have been developed in pursuing improved viewing angles required for viewing from different angles.

On the other hand, liquid crystal elements in applications other than display include a liquid crystal switching element that transmits the incident light with the polarization plane selectively rotated. In terms of display, such liquid crystal switching elements are elements switching two states, black display and white display. In many cases, they have two different action; they transmit a linearly polarized light with or without the polarized light transmission axis rotated by 90 degrees. In the present specification, liquid crystal elements switching these two states are referred to as polarization switching liquid crystal elements.

Liquid crystal materials and structures different from those in display applications are being studied for the polarization switching liquid crystal element used for switching. For example, one of the requirements for switching elements is the switching speed. Some known elements use ferroelectric liquid crystal for higher switching response speeds. However, ferroelectric liquid crystal is unstable in terms of durability and expensive and therefore not practical.

TN (twist nematic) liquid crystal is known for its stable durability and inexpensiveness. However, TN liquid crystal generally has a lower response speed compared with ferroelectric liquid crystal. Therefore, the thickness of liquid crystal (cell gap) must be small in order to realize a high response speed using TN liquid crystal. However, when the cell gap is simply reduced, the rotation of the polarization becomes wavelength-dependent.

A known means for eliminating the wavelength-dependency consists of, for example, a combination of phase plates (for example, see Patent Document 1, Japanese Patent Application Laid-Open No. H7-64048). In such a case, the addition of phase plates increases parts cost.

Some image display apparatuses having a spatial light modulation element such as a transmissive LCD utilize the wobbling technique in which a pixel shifting element is used to improve the resolution of the spatial light modulation element. In the wobbling technique, a pixel shifting element consisting of a polarization switching liquid crystal element for selectively rotating the polarization by 90 degrees and a birefringent plate for selectively shifting the light beam according to the polarization direction is used to synchronize the pixel shifting due to the light beam shifting with the image on the spatial light modulation element corresponding to the shifted light beam position for higher resolution.

It is advantageous that the polarization switching liquid crystal element used in the above pixel shifting element is capable of high speed response. Therefore, ferroelectric liquid crystal is used in some known cases (for example, see Patent Document 1). However, ferroelectric liquid crystal is unstable in terms of durability and expensive as described above and is therefore not practical.

In some known cases, durable and inexpensive TN crystal is used and the drive timing is optimized in consideration of the response speed (for example, see Patent Document 2, Japanese Patent Application Laid-Open No. H11-296135). However, this technique has limitations in applying to field-sequential image display apparatuses in which R, G, and B colors are sequentially displayed. There is also a demand for TN liquid crystal having a high response speed.

Field-sequential image display apparatuses (for example projectors) have been realized as color field-sequential image display apparatuses as the spatial light modulation element has higher response speeds. In the color field-sequential image display apparatus, one spatial light modulation element is illuminated with R, G, or B color light in sequence to modulate them according to information of each color for color display. In this way, a simplified and inexpensive structure can be realized compared to three-plate image display apparatuses in which three spatial light modulation elements are used for R, G, and B colors.

The color field-sequential image display apparatus has color breaking as a result of sequential color illumination. Therefore, higher display frequencies are required for the respective colors. When the pixel shifting is performed by wobbling in the color field-sequential image display apparatus, the polarization switching liquid crystal element consisting of TN liquid crystal has to be capable of high speed operation corresponding to the spatial light modulation element.

The high speed response capability of the polarization switching liquid crystal element can be improved to some extent by optimizing the drive timing of the TN liquid crystal. In order to improve the wobbling performance, TN liquid crystal having a higher response speed is desired.

For example, when the cell gap is reduced in order to increase the response speed of TN liquid crystal, false colors appear because of the wavelength-dependent light rotation property, deteriorating the displayed image quality. In order to prevent false colors due to the wavelength-dependency, phase plates can be provided as disclosed in the above patent Document 1. However, parts cost may be increased as described above.

SUMMARY OF THE INVENTION

The first purpose of the present invention in view of the above circumstances is to provide a polarization switching liquid crystal element having a high response speed and reduced wavelength-dependency using inexpensive and highly durable TN liquid crystal without increasing parts cost.

The second purpose of the present invention is to provide an image display apparatus in which the above polarization switching liquid crystal element is used for pixel-shifting so as to prevent false colors and provide high-quality and resolution images.

The first aspect of the invention, which achieves the first object described above is a polarization switching liquid crystal element having TN liquid crystal retained between two transparent substrates for transmitting at least visible polarized light with the polarized light transmission axis selectively rotated by 90 degrees when a voltage is selectively applied to the TN liquid crystal, wherein a phase difference u of said TN liquid crystal is defined by the following equation:

$$u=2\times \Delta n\times d/\lambda$$

where $\Delta n$ is the refractive index anisotropy of said TN liquid crystal, d is the thickness of said TN liquid crystal, and $\lambda$ is the wavelength of said polarized light and a transmittance T of said polarization switching liquid crystal element measured with polarization plates on the incident and outgoing sides is defined by the following equation:

$$T=(\tfrac{1}{2})\times \sin^2\{\pi(1+u^2)^{1/2}/2\}/(1+u^2), \text{ and}$$

wherein the phase difference u includes a value 1.7 and the transmittance T is 0.1 or lower when the $\lambda$ ranges from 400 nm to 700 nm.

The second aspect of the invention resides in the polarization switching liquid crystal element according to the first aspect, wherein the thickness d of the TN liquid crystal is 4 µm or smaller.

The third aspect of the invention, which achieves the second object described above, is an image display apparatus having a polarization switching liquid crystal element, comprising:

a visible light source emitting at least visible light;

polarization conversion means for converting the visible light from the visible light source to a specific polarized light;

spatial light modulation means for modulating the polarized light from the polarization conversion means relating to image information;

pixel shifting means for shifting pixels having the polarization switching liquid crystal element and a birefringent element, pixel-shifting of the modulated light from the spatial light modulation means being performed by selectively applying a voltage to the polarization switching liquid crystal element; and display optical means for displaying the modulated light having passed through the pixel shifting means, wherein the polarization switching liquid crystal element has TN liquid crystal retained between two transparent substrates for transmitting at least visible polarized light with the polarized light transmission axis selectively rotated by 90 degrees when a voltage is selectively applied to the TN liquid crystal, and wherein:

a phase difference u of said TN liquid crystal is defined by the following equation:

$$u=2\times \Delta n\times d/\lambda$$

where $\Delta n$ is the refractive index anisotropy of said TN liquid crystal, d is the thickness of said TN liquid crystal, and $\lambda$ is the wavelength of said polarized light, and a transmittance T of said polarization switching liquid crystal element measured with polarization plates on the incident and outgoing sides is defined by the following equation:

$$T=(\tfrac{1}{2})\times \sin^2\{\pi(1+u^2)^{1/2}/2\}/(1+u^2), \text{ and}$$

wherein the phase difference u includes a value 1.7 and the transmittance T is 0.1 or lower when the $\lambda$ ranges from 400 nm to 700 nm.

The forth aspect of the invention resides in the image display apparatus according to the third aspect, wherein the visible light source emits R, G, and B color lights to the spatial light modulation means in field sequence; and the spatial light modulation means modulates image information in sequence in correspondence with each of the color lights from the visible light source.

The fifth aspect of the invention resides in the image display apparatus according to the forth aspect, wherein the spatial light modulation means switches image information on the entire screen simultaneously in correspondence with each of the color lights from the visible light source.

The sixth aspect of the invention resides in the image display apparatus according to the third aspect, wherein light beam transmits the polarization switching liquid crystal element at an inclination angle of 30 degrees or smaller.

The seventh aspect of the invention resides in the image display apparatus according to the forth aspect, wherein light beam transmits the polarization switching liquid crystal element at an inclination angle of 30 degrees or smaller.

The eighth aspect of the invention resides in the image display apparatus according to the fifth aspect, wherein light beam transmits the polarization switching liquid crystal element at an inclination angle of 30 degrees or smaller.

The ninth aspect of the invention resides in the image display apparatus according to the third aspect, wherein thickness d of the TN liquid crystal of the polarization switching liquid crystal element is 4 µm or smaller.

The tenth aspect of the invention resides in the image display apparatus according to the forth aspect, wherein thickness d of the TN liquid crystal of the polarization switching liquid crystal element is 4 µm or smaller.

The eleventh aspect of the invention resides in the image display apparatus according to the fifth aspect, wherein thickness d of the TN liquid crystal of the polarization switching liquid crystal element is 4 µm or smaller.

The twelfth aspect of the invention resides in the image display apparatus according to the sixth aspect, wherein the thickness d of the TN liquid crystal of the polarization switching liquid crystal element is 4 µm or smaller in the image display apparatus relating to the sixth aspect.

The thirteenth aspect of the invention resides in the image display apparatus according to the seventh aspect, the thickness d of the TN liquid crystal of the polarization switching liquid crystal element is 4 µm or smaller in the image display apparatus relating to the seventh aspect.

The fourteenth aspect of the invention resides in the image display apparatus according to the eighth aspect, wherein the thickness d of the TN liquid crystal of the polarization switching liquid crystal element is 4 µm or smaller in the image display apparatus relating to the eighth aspect.

In the polarization switching liquid crystal element of the present invention, a phase difference u of said TN liquid crystal is defined by the following equation:

$$u=2\times \Delta n\times d/\lambda$$

where $\Delta n$ is the refractive index anisotropy of said TN liquid crystal, d is the thickness of said TN liquid crystal, and $\lambda$ is the wavelength of said polarized light and a transmittance T of said polarization switching liquid crystal element measured with polarization plates on the incident and outgoing sides is defined by the following equation:

$$T=(\tfrac{1}{2})\times \sin^2\{\pi(1+u^2)^{1/2}/2\}/(1+u^2),$$

and the phase difference u includes a value 1.7 and the transmittance T is 0.1 or lower when the $\lambda$ ranges from 400 nm to 700 nm; therefore, a high response speed and reduced wavelength-dependency are realized using inexpensive and highly durable TN liquid crystal without increasing parts cost.

Furthermore, using the above polarization switching liquid crystal element for pixel shifting, the image display apparatus of the present invention provides high quality and high resolution images while preventing false colors.

BRIEF DESCRIPTION OF THE DRAWINGS

FIG. 12 is an illustration for explaining an ideal pixel shifting without crosstalk;

FIG. 13 is an illustration for explaining RGB crosstalk generated according to characteristics of the polarization switching liquid crystal element;

Figure 1:
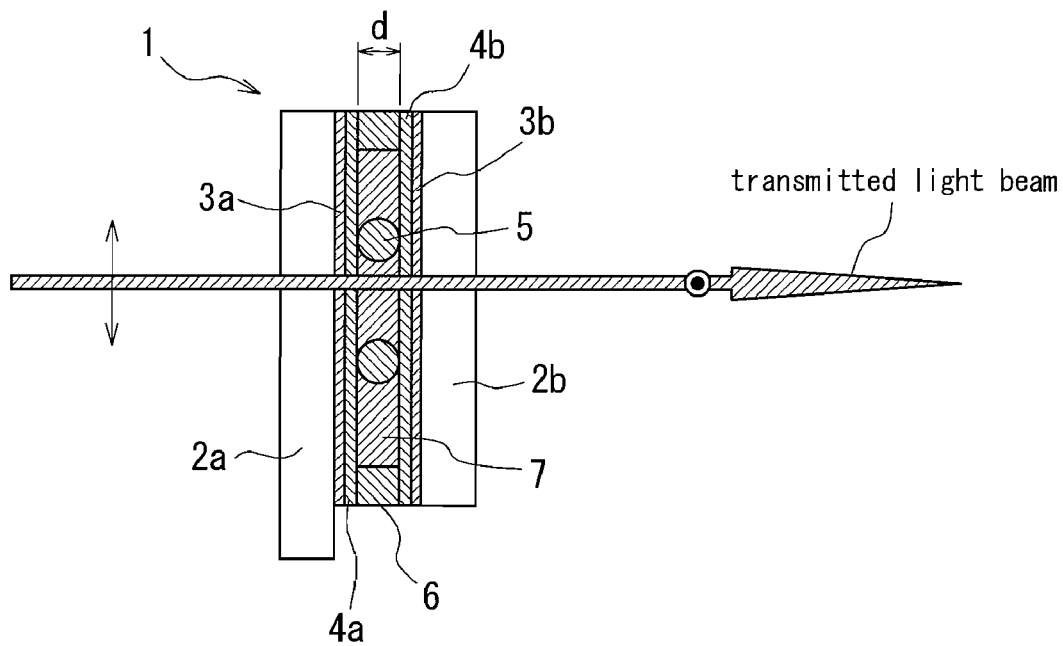
FIG. 1 is a schematic cross-sectional view showing the structure of an embodiment of the polarization switching liquid crystal element of the present invention.

REFERENCE NUMERALS 1, 1a, 1b, 1L, 1R polarization switching liquid crystal element
2q, 2b transparent substrate
3a, 3b transparent electrode
4a, 4b liquid crystal oriented film
5 spacer
6 sealing member
7 liquid crystal material
11 measuring light source
12 light receiving element
13a, 13b polarization plate
15 light source emission circuit
16 measurement control circuit
17 liquid crystal cell drive circuit
18 PD amplifier circuit
21 color field-sequential illumination means
22, 22R, 22G, 22B spatial light modulation element
23 illumination optical system
24, 24a, 24b pixel shifting optical unit
25 screen
26 projection optical system
27 modulation element drive circuit
28 liquid crystal cell drive circuit
29 pixel shifting control circuit
31 light source
32 color wheel
33 PS conversion element
34 integrator rod
35 illumination lens
36, 36a, 36b birefringent plate
41 PBS
51 white light source
52 fly's eye lens
53 PS conversion element
54, 55 dichroic mirror
56, 57, 58 mirror
59 color combining prism
61 3D glasses
62L, 62R, 63R, 63L polarization plate
64 liquid crystal cell drive circuit

DETAILED DESCRIPTION OF THE PREFERRED EMBODIMENTS

Embodiments of the present invention are described in detail hereafter with reference to the drawings.

FIG. 1 is a schematic cross-sectional view showing an embodiment of the polarization switching liquid crystal element of the present invention.

A polarization switching liquid crystal element (liquid crystal cell) 1 has two transparent substrates 2a and 2b made of for example low-expansion glass, on which transparent electrodes 3a and 3b made of for example ITO and liquid crystal oriented films 4a and 4b consisting of polyimide film, diamond paste, or SiO oblique evaporation are formed. The liquid crystal oriented films 4a and 4b preferably consist of an organic material such as diamond paste and SiO in applications wherein powerful light containing a large amount of visible light close to ultraviolet is used such as projectors.

The transparent substrates 2a and 2b on which the liquid crystal oriented films 4a and 4b are formed are arranged in the manner that their alignment direction are not in parallel (generally they are arranged at an angle of 90 degrees although this is not always the case). Spacers 5 made of glass beads or glass fibers are interposed to create an intended uniform gap. A sealing member 6 such as UV curing adhesive seals the periphery except for the liquid crystal inlet (not shown). After a liquid crystal material 7 consisting of a TN liquid crystal material is injected through the liquid crystal inlet, adhesive such as epoxy adhesive is applied and cured to seal the liquid crystal inlet.

The thickness of the liquid crystal layer or the cell gap d should be uniform as much as possible. The liquid crystal material 7 has a refractive index anisotropy (birefringent index difference) Δn as a physical property. The spacers 5 determining the cell gap d can be placed in the optically effective region as shown in the figure. However, they can be mixed with the sealing member 6 when differences in optical properties between the liquid crystal material 7 and the spacers 5 are influential and lead to different optical properties.

With the above structure, the polarization switching liquid crystal element 1 operates as a polarization switch that transmits the incident linearly polarized light having a vertically polarized light transmission axis with the transmission axis rotated by 90 degrees so that the light has a horizontally polarized light transmission axis when no voltage is applied between the transparent electrodes 3a and 3b and transmits the incident linearly polarized light having a vertically polarized light transmission axis without the transmission axis rotated so that the light emerges as it is when a voltage is applied between the transparent electrodes 3a and 3b.

Figure 2:
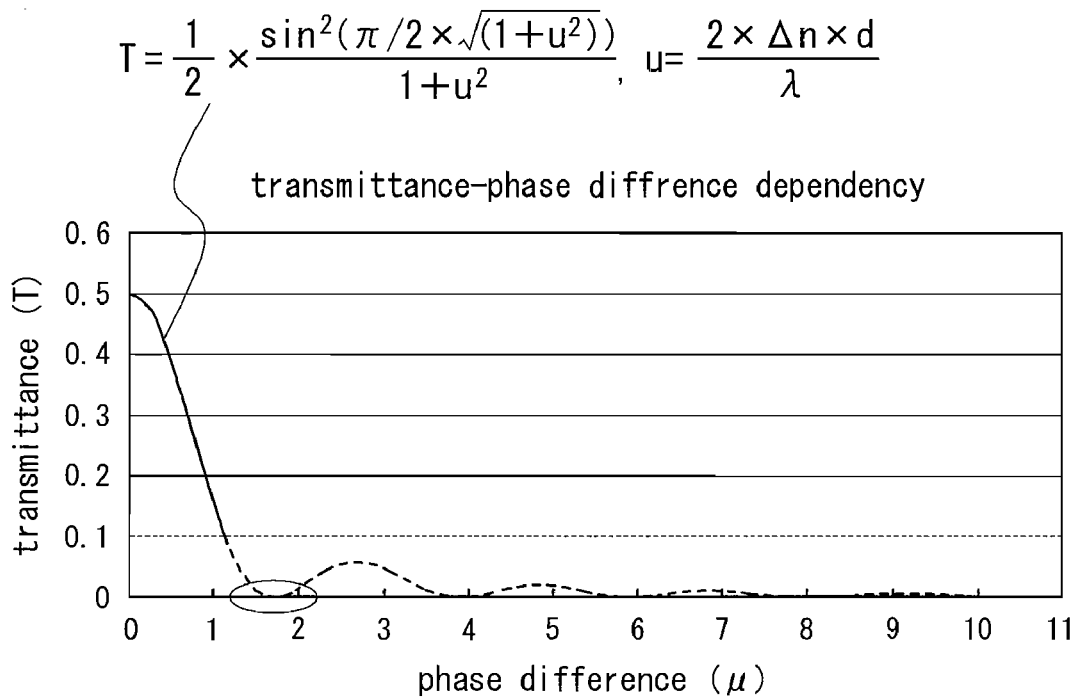
FIG. 2 is a graphical representation showing the transmittance-phase difference dependency of TN liquid crystal.

FIG. 2 is a graphical representation showing the transmittance-phase difference dependency of TN liquid crystal. The transmittance T is plotted as ordinate and the phase difference u is plotted as abscissa.

The phase difference u is expressed by:

$$u = 2 \times \Delta n \times d / \lambda \qquad (1)$$

wherein λ is the wavelength of the incident light. The transmittance T measured with polarization plates on the incident and output sides is expressed by:

$$T = (1/2) \times \sin^2\{\pi(1+u^2)^{1/2}/2\}/(1+u^2) \qquad (2)$$

The polarization switching liquid crystal element 1 serves as a switch by selectively rotating the polarized light transmission axis of the incident linearly polarized light by 90 degrees. The switching performance includes a switching level at which the polarized light transmission axis is rotated or not rotated.

FIG. 2 shows performance similar to the above switching level, indicating that the level can be completely discrete when the transmittance T is nearly zero. The present inventor conducted various experiments and confirmed that liquid crystal materials having a transmittance T of 0.1 or lower serve as an excellent polarization switch.

On the other hand, the phase difference u depends on the wavelength λ of the light as apparent from the above equation (1). Therefore, the transmittance T changes according to the wavelength. When the cell gap d is 4 μm, the wavelength λ falls under the visible light range (380 nm to 780 nm), and the liquid crystal material 7 has a birefringent index difference Δn of 0.13 in order to improve the response speed of the polarization switching liquid crystal element 1, the phase difference u is 2.73 to 1.33 and the transmittance T is 0.06 or lower.

With the cell gap d being 4 μm, a high response speed can be realized.

Conversely, when the same liquid crystal material having a Δn of 0.13 is used with a cell gap d of 2 μm in order to further improve the response speed, the phase difference u is 1.36 to 0.66 and the transmittance T is 0.31 for the visible light wavelength (380 nm to 780 nm). The target value of 0.1 or lower cannot be achieved. When a liquid crystal material having a Δn of 0.24 is used under the same conditions, the transmittance T is 0.07, which satisfies the target value of 0.1 or lower.

As described above, the phase difference u is decreased as the cell gap d is reduced. Then, liquid crystal materials having a larger Δn should be used in order to obtain a transmittance T of 0.1 or lower.

The visible light wavelengths range from 380 nm to 780 nm in the above explanation. Considering the degree of influence of the visible light, the visible light wavelengths ranging from 400 nm to 700 nm are mainly used in practice. With the liquid crystal being conditioned to this range, a wider range of liquid crystal materials can be selected.

Usable liquid crystal materials having a large Δn include the following liquid crystal material having a Δn of approximately 0.35 manufactured by Merck or Asahi Denka for display applications:

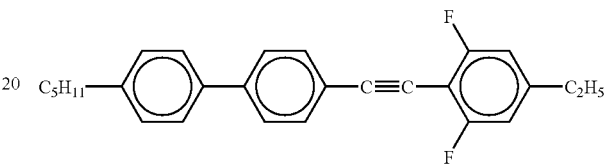

Considering availability and stable performance, the largest Δn is approximately 0.26 at the moment. This is because it is more important to obtain the viewing angle property that is the property change in relation to oblique incident light or fine gradation display of two or more levels in display applications than to obtain the capability of switching two polarization states as in the polarization switching liquid crystal element of the present invention. It is difficult to obtain the viewing angle property when the Δn is large.

The polarization switching liquid crystal element of the present invention has the liquid crystal structure optimized for higher response speeds in transmitting the polarized light with the polarized light transmission axis selectively rotated. Therefore, even if a liquid crystal material having a Δn of 0.26 or smaller is used, the transmittance T can be 0.1 or lower. For example, when a liquid crystal material having a Δn of 0.202 is used, the transmittance T can be 0.1 or lower for the wavelength range from 400 nm to 700 nm with the cell gap d being 2 μm.

In order to obtain a transmittance of 0.1 or lower, it is desirable to constitute the liquid crystal in the manner that the phase difference u is within a range around approximately 1.7 for a wavelength of 550 nm as marked by an oval in FIG. 2.

Figure 3:
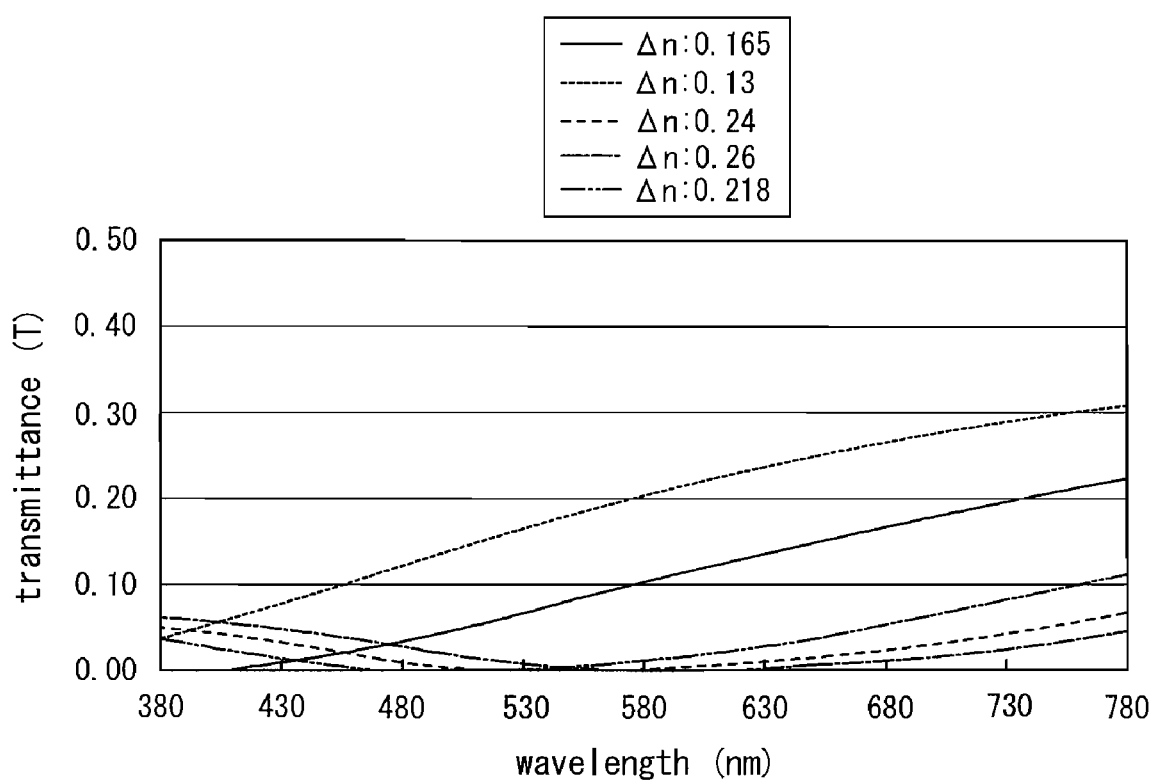
FIG. 3 is a graphical representation showing the transmittance-wavelength dependency of the polarization switching liquid crystal element.

FIG. 3 is a graphical representation showing the transmittance-wavelength dependency of the polarization switching liquid crystal element obtained using the equations (1) and (2) wherein the cell gap d is 2 μm, the wavelength λ is 380 nm to 780 nm, and Δn is 0.13, 0.165, 0.218, 0.24, or 0.26.

As apparent from FIG. 3, the Δn should be larger than 0.218 to ensure T≦0.1 for λ=380 nm to 780 nm. When the operation wavelength λ is 400 nm to 700 nm, T≦0.1 is satisfied even if the Δn is 0.218, which makes the material usable. When the liquid crystal is constituted to have a cell gap d of 2 μm, the phase difference u is approximately 1.7 in FIG. 2. When the phase difference u is smaller, T≦0.1 is not ensured.

Figure 4:
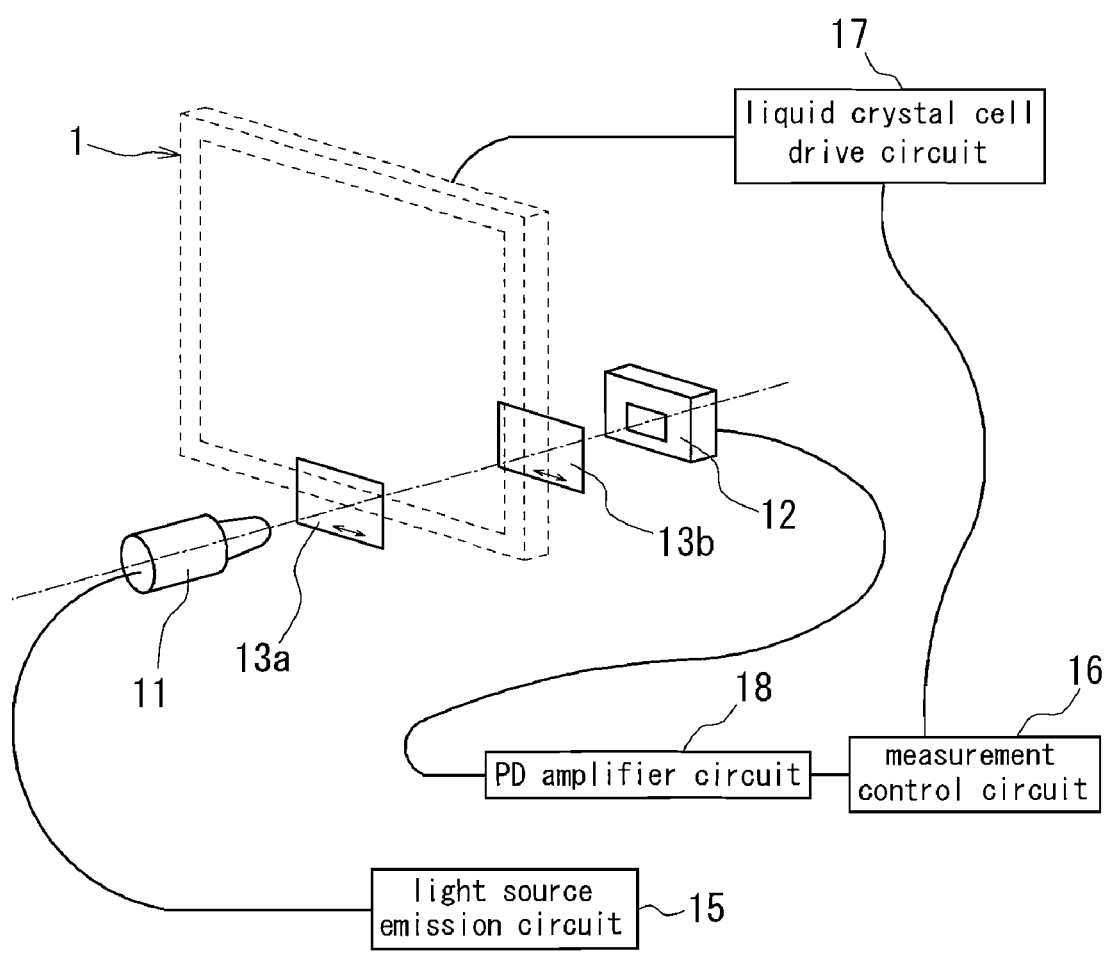
FIG. 4 is an illustration showing a circuit for measuring the transmittance of the polarization switching liquid crystal element.
Figure 5:
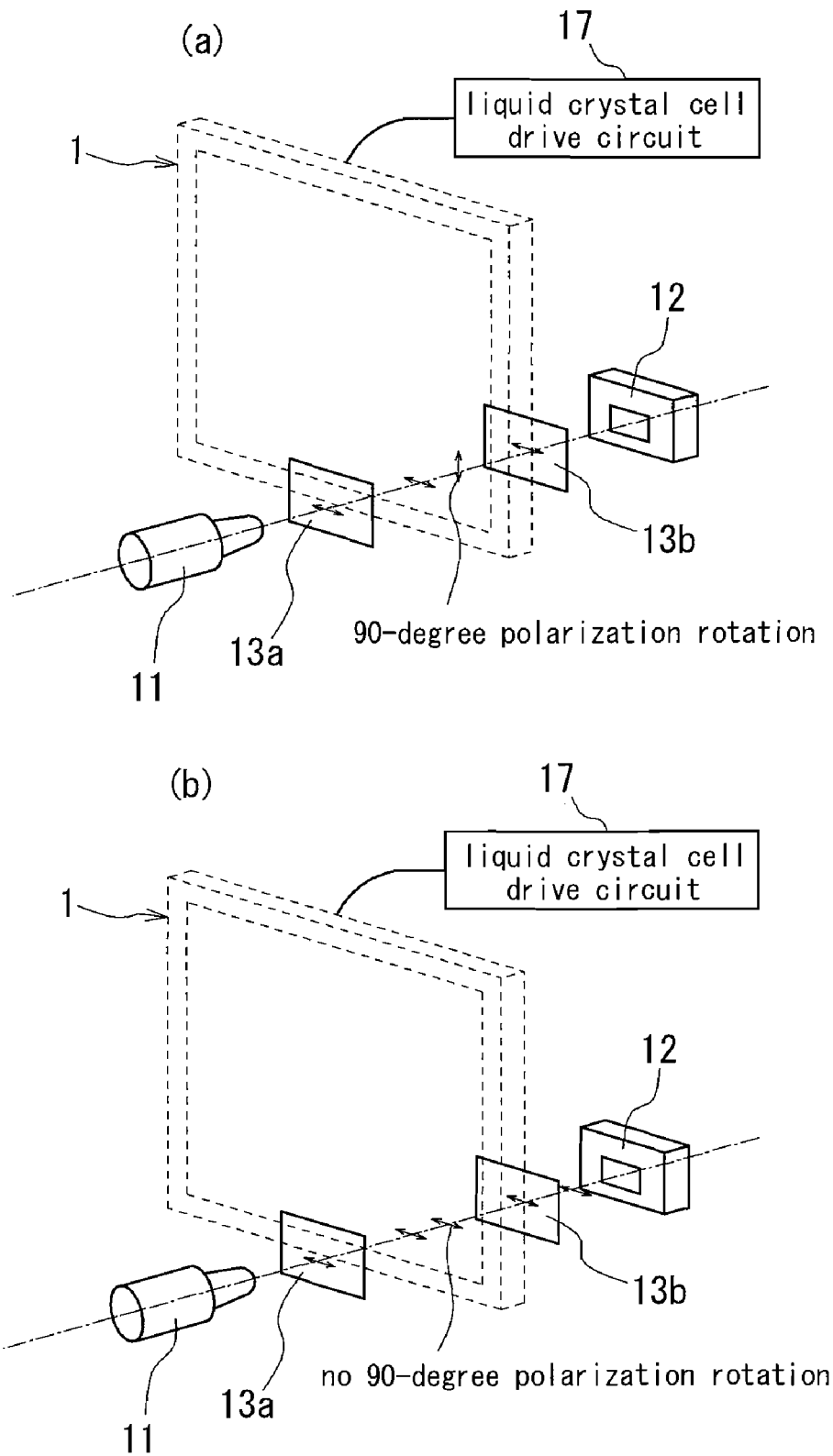
FIGS. 5 (a) and (b) are illustrations for explaining measurement of the transmittance of the polarization switching liquid crystal element.
Figure 6:
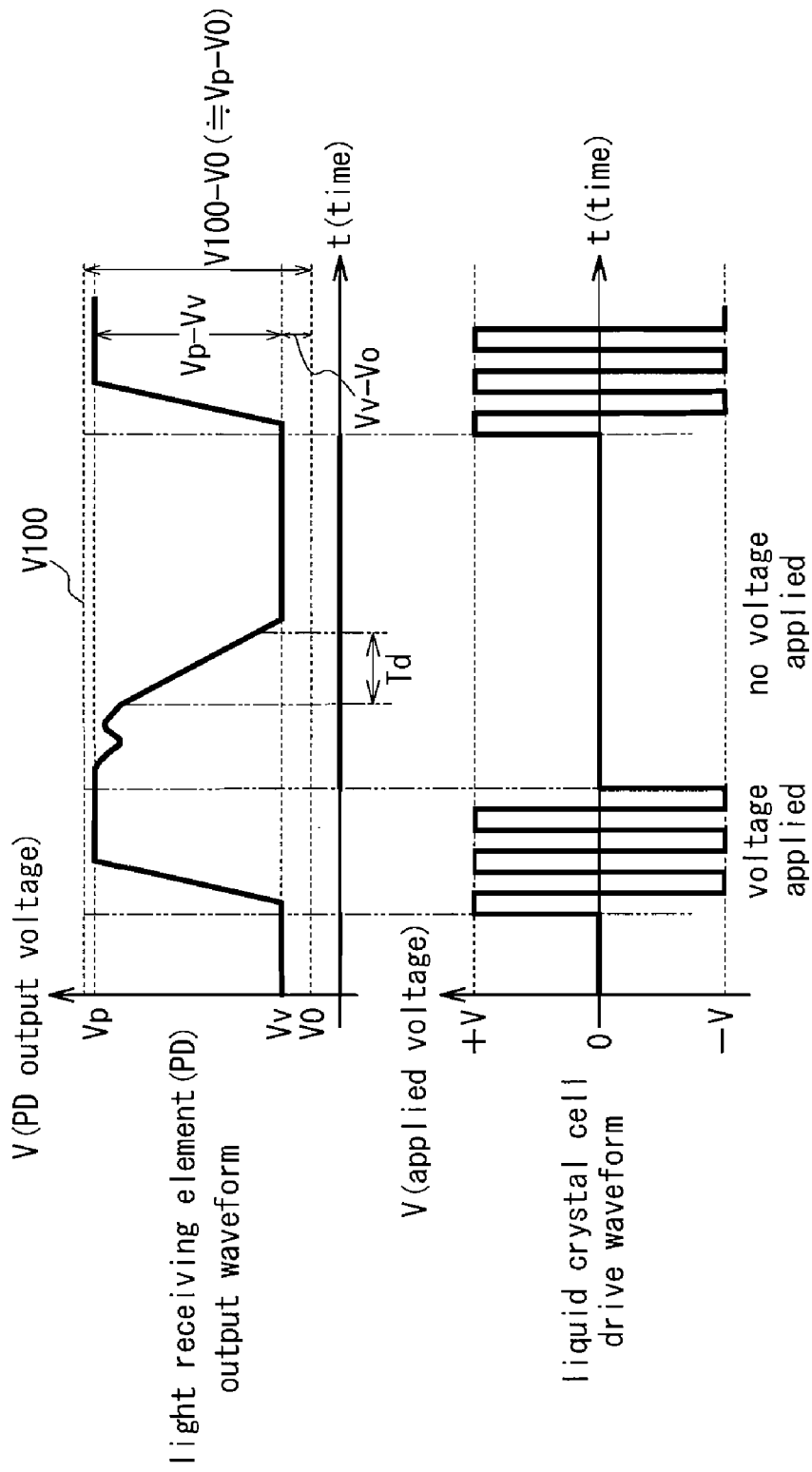
FIG. 6 is an Illustration showing the drive waveform of the polarization switching liquid crystal element and the output waveform of the light receiving element 12.

Measurement of the properties of the polarization switching liquid crystal element is described hereafter with reference to FIGS. 4 to 6.

FIG. 4 is an illustration showing a circuit for measuring the transmittance T of the polarization switching liquid crystal element. The ability of the polarization switching liquid crystal element is determined by the polarization switching speed and two polarization states, that is, the switched states. FIGS. 4 to 6 are mainly to explain the switched states.

For example, in a poorly switched state, the polarized light may not be rotated while it is supposed to be rotated by the polarization switching liquid crystal element. In other words, the two, rotated and unrotated, states concurrently present and the switching is not properly performed. An ideal switching 1 versus 0 is achieved when the transmittance T is nearly zero as shown in FIG. 2. The chance of the two states being concurrently present is increased as the transmittance T is increased.

For measuring the switched states, the polarization switching liquid crystal element 1, which is an object to be measured, is interposed between a measuring light source 11 and a light receiving element 12. Furthermore, polarization plates 13a and 13b are interposed between the measuring light source 11 and the polarization switching liquid crystal element 1 and between the polarization switching liquid crystal element 1 and the light receiving element 12, respectively, in parallel nicols (the polarized light transmission axes are parallel with each other).

A light source emission circuit 15 allows the measuring light source 11 to normally emit. A voltage or no voltage is applied to the polarization switching liquid crystal element 1 by a liquid crystal cell drive circuit 17 alternately in a binary manner under the control of a measurement control circuit 16. This is explained in detail with reference to FIG. 4. The light receiving element 12 has a PD (photodiode), the output of which is amplified by a PD amplifier circuit 18 and supplied to the measurement control circuit 16.

With the above structure, the operation of the polarization switching liquid crystal element 1 is measured as transmittance while a voltage or no voltage is applied to the polarization switching liquid crystal element 1. The optical behavior during the transmittance measurement is described in detail with reference to FIG. 5.

For measuring the wavelength-dependency of the switched states of the polarization switching liquid crystal element 1, the transmittances to R, G, and B wavelengths are measured using LEDs each emitting R, G, or B wavelength light as the measuring light source 11.

In FIG. 4, the polarization plates 13a and 13b are placed in parallel nicols to measure the transmittance T. They can be placed in crossed nicols. As a result, a measurement in one state is obtained and a measurement in the other state can be deduced. Particularly, when TN liquid crystal is used, it is easier in parallel nicols to deduce a measurement in the other state. This is described later with reference to FIG. 6. Explanation will be made on the basis of the parallel nicols configuration hereafter. The response speed can be measured in the structure of FIG. 4, the explanation of which is omitted here.

FIGS. 5 (a) and (b) are illustrations for explaining the measurement of the transmittance of the polarization switching liquid crystal element 1. No voltage is applied to the polarization switching liquid crystal element 1 in FIG. 5 (a) and a voltage is applied to the polarization switching liquid crystal element 1 in FIG. 5 (b).

As shown in FIG. 5 (a), when no voltage is applied to the polarization switching liquid crystal element 1, light from the measuring light source 11 becomes light having a horizontally polarized light transmission axis after passing through the polarization plate 13. The light is rotated by the polarization switching liquid crystal element 1 by 90 degrees and incident on the polarization plate 13b as light having a vertically polarized light transmission axis. The polarization plate 13b having a horizontally polarized light transmission axis does not transmit the light and no light reaches the light receiving element 12.

On the other hand, as shown in FIG. 5 (b), when a voltage is applied to the polarization switching liquid crystal element 1, light from the measuring light source 11 becomes light having a horizontally polarized light transmission axis after passing through the polarization plate 13a. The light is not rotated by the polarization switching liquid crystal element 1 and is incident on the polarization plate 13b as it is while maintaining the horizontally polarized light transmission axis. The polarization plate 13b having a horizontally polarized light transmission axis transmits the light having a horizontally polarized light transmission axis and the light reaches the light receiving element 12.

FIG. 6 shows the drive waveform of the polarization switching liquid crystal element 1 and the output waveform of the light receiving element 12. FIG. 6 shows the drive waveform to apply a voltage/no voltage to polarization switching liquid crystal element 1 at the bottom and the output waveform of the light receiving element 12 corresponding to the drive waveform at the top. Vp and Vv are the output voltages in association with the output waveform of the light receiving element when a voltage or no voltage is applied.

V0 is the dark current value of the measuring system under no light from the measuring light source 11. V100 is the total transmittance of the measuring system. The total light amount passing through the polarization switching liquid crystal element 1 is simply divided into two, vertically and horizontally polarized light components and unchanged in quantity. Therefore, V100 is actually determined by obtaining a measurement while a voltage is applied to the polarization switching liquid crystal element 1 in the same manner as shown in FIG. 6 with the polarization plates 13a and 13b in FIG. 4 being arranged in crossed nicols and adding the measurement to Vp in FIG. 6.

Generally, TN crystal liquid has an optically stable birefringence and is not elliptically polarized because the liquid crystal is uniformly oriented while a voltage is applied; therefore, V100 and Vp are nearly equal. On the other hand, TN crystal liquid tends to be elliptically polarized while no voltage is applied. Then, the crosstalk rate due to elliptical polarization can be determined based on a ratio of Vp−Vv to Vv−V0 provided that V100 is nearly equal to Vp when the polarization switching liquid crystal element 1 consists of TN liquid crystal.

Liquid crystal is generally evaluated based on the transmittance T. A state of the liquid crystal which has high transmittance when no voltage is applied with the polarization plates 13a and 13b arranged in crossed nicols configuration is called normally white, and another state which has low transmittance when no voltage is applied with the polarization plates 13a and 13b arranged in parallel nicols configuration is called normally black.

The transmittance shown in FIGS. 2 and 3 are obtained in the normally black state. The polarization switching liquid crystal element 1 according to this embodiment can also be evaluated in the same manner. With the value at V100 being normalized to a transmittance of 50%, the transmittance T (%) is expressed by $T = (Vv - V0)/(2 \times (Vp - V0)) \times 100$. The value at 50% is treated as the maximum because the polarization light transmission axis in one direction is measured using a polarization plate.

The response speed of the polarization switching liquid crystal element 1 is measured in the circuit shown in FIG. 4. When TN liquid crystal is used, particularly the response speed upon the removal of a voltage, response speed Td from 10% point from start of falling to a 10% point to the end of falling in the course of the output voltage of the light receiving element 12 falling from Vp to Vv in FIG. 6, is slow.

Figure 7:
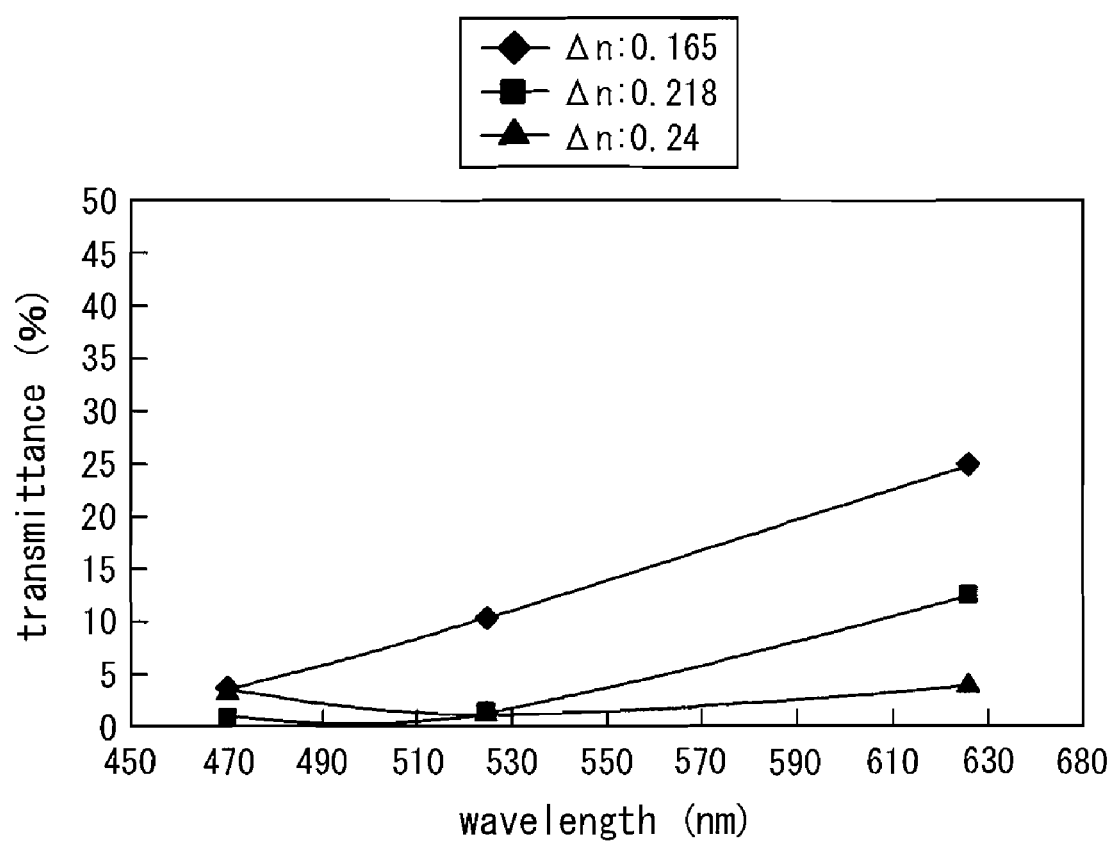
FIG. 7 is a graphical representation showing the transmittance-wavelength dependency of the polarization switching liquid crystal element.

FIG. 7 is a graphical representation showing the transmittance-wavelength dependency of the polarization switching liquid crystal element measured by the measuring method described with reference to FIGS. 4 to 6.

Here, the transmittance-wavelength dependency was determined in the polarization switching liquid crystal element constituted with a cell gap d of 2 μm and three different TN liquid crystal materials having a Δn of 0.165, 0.218, or 0.24. The measuring light source 11 consisted of LEDs having a wavelength of 626 nm, 525 nm, or 470 nm. The measuring temperature was 50° C.

As apparent from FIG. 7, when the cell gap d was 2 μm, the TN liquid crystal having a Δn of 0.24 yielded the lowest transmittance T throughout the entire visible wavelength range. As described with reference to FIGS. 2 and 3, it is desirable in terms of performance that the transmittance is low in a wide wavelength range.

Here, the Δn has temperature characteristics; therefore, the measurements in FIG. 7 do not exactly match, but nearly match and correlate with the calculated values in FIG. 3. Then, the polarization switching liquid crystal element 1 can be constituted based on calculated values.

Figure 8:
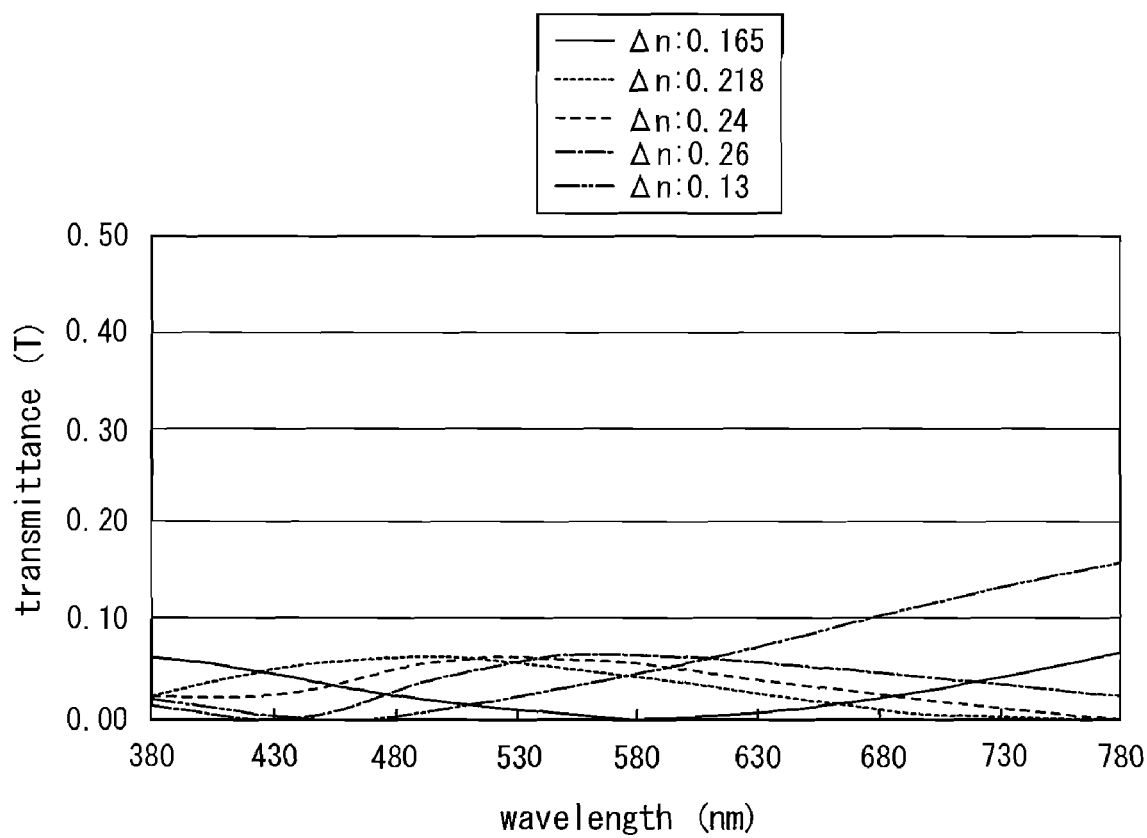
FIG. 8 is a graphical representation showing the calculation results of the transmittance-wavelength dependency of the polarization switching liquid crystal element.

FIG. 8 is a graphical representation showing the calculation results of the transmittance-wavelength dependency of the polarization switching liquid crystal element. Here, calculations were performed for five different liquid crystal materials having a Δn of 0.13, 0.165, 0.218, 0.24, and 0.26 with a cell gap d of 3 μm.

As apparent from FIG. 8, when the cell gap d is 3 μm, any liquid crystal material except for the one having a Δn of 0.13 can be used. In other words, according to the calculation, any liquid crystal material having a Δn≧0.135 leads to a transmittance T of 0.1 or lower throughout the entire visible light wavelength range.

Figure 9:
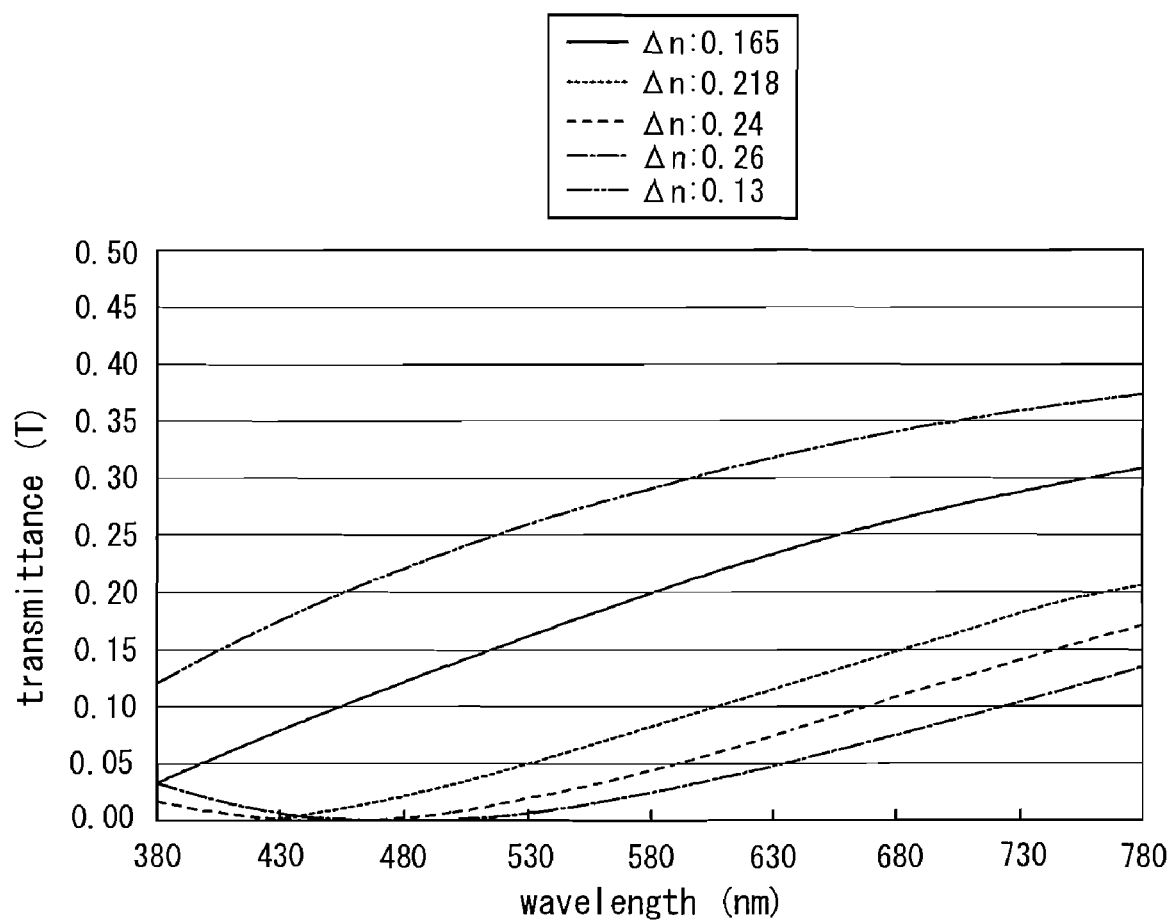
FIG. 9 is another graphical representation showing the calculation results of the transmittance-wavelength dependency of the polarization switching liquid crystal element.

FIG. 9 is a graphical representation showing the calculation results of the transmittance-wavelength dependency of the polarization switching liquid crystal element. Here, calculations were performed for five different liquid crystal materials having a Δn of 0.13, 0.165, 0.218, 0.24, and 0.26 as in FIG. 8 with a cell gap d of 1.6 μm.

When the cell gap d is reduced to 1.6 μm, the phase difference u is shifted to the smaller. Then, in this case, only the liquid crystal material having a Δn of 0.26 can be used. In other words, in this case, according to the calculation, any liquid crystal material having a Δn≧0.252 leads to a transmittance T of 0.1 or lower throughout the entire visible light wavelength range.

Embodiments of the image display apparatus of the present invention comprising the above described polarization switching liquid crystal element are described hereafter.

Figure 10:
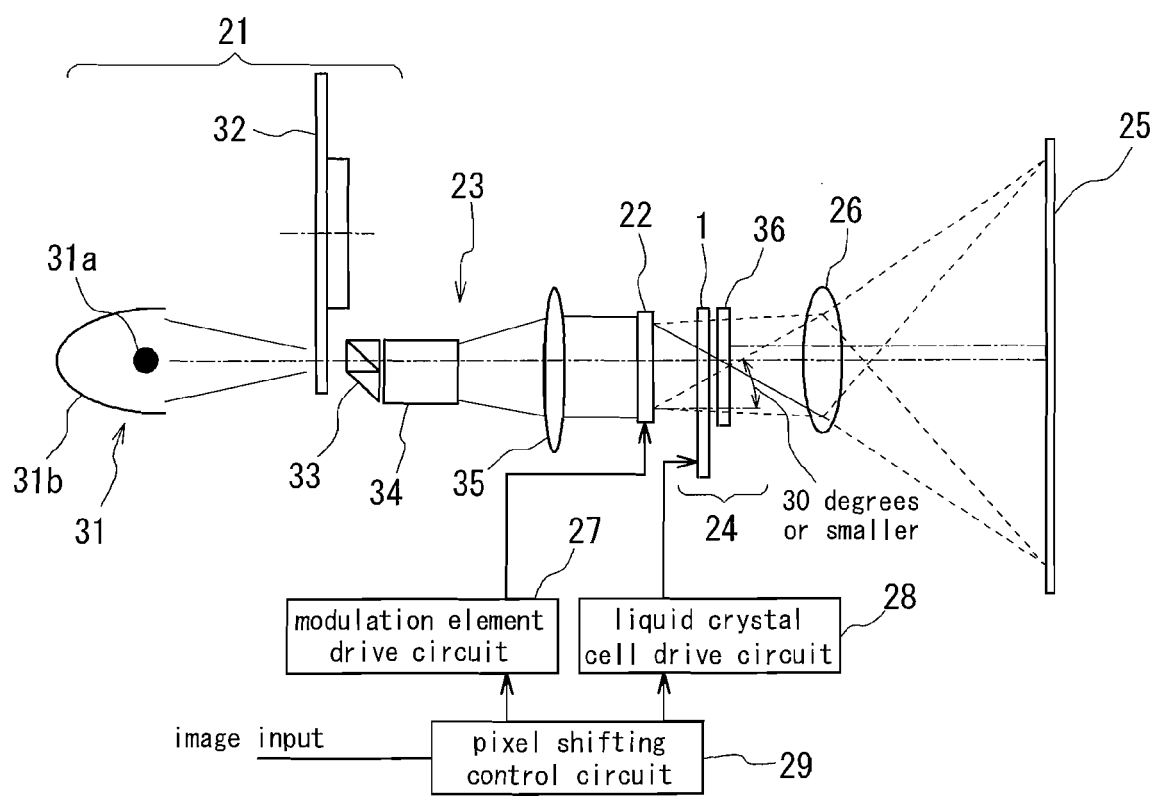
FIG. 10 is a schematic illustration showing the structure of Embodiment 1 of the image display apparatus of the present invention.

FIG. 10 is a schematic illustration showing the structure of Embodiment 1 of the image display apparatus of the present invention.

This image display apparatus is a projector realizing two-pixel shifting (wobbling) in the horizontal direction using the above described polarization switching liquid crystal element 1 of the present invention, comprising a color field-sequential illumination means 21 capable of color field-sequential illumination, a spatial light modulation element 22 for displaying input image signals, an illumination optical system 23 efficiently guiding illumination light from the color field-sequential illumination means 21 to the spatial light modulation element, a pixel shifting optical unit 24 including the polarization switching liquid crystal element 1, a projection optical system 26 for enlarging and projecting light having passed through the pixel shifting optical unit 24 on a screen 25, a modulation element drive circuit 27 driving the spatial light modulation element 22, a liquid crystal cell drive circuit 28 driving the polarization switching liquid crystal element 1, and a pixel shifting control circuit 29 controlling the drive of the modulation element drive circuit 27 and liquid crystal cell drive circuit 28 based on input image signals.

The color field-sequential illumination means 21 has a light source 31 comprising a white lamp 31a emitting white light such as an ultra-high pressure mercury lamp, metal halide lamp, and xenon lamp and an elliptical reflector 31b collecting the emitted light on a specific point, and a color wheel 32 rotating a disk carrying multiple color filters each transmitting R, G, or B wavelength to generate three, R, G, and B, color lights in a time-sharing manner. Here, LEDs or LDs can be used in place of the white lamp 31a and they are controlled to emit R, G, or B wavelength light in sequence.

The illumination optical system 23 is a telecentric system consisting of a PS conversion element 33 that is a polarized light conversion means efficiently generating a specific linearly polarized light from the illumination light from the color field-sequential illumination means 21, an integrator rod 34 allowing the polarized light from the PS conversion element 33 to reach multiple light points for example by internal reflection, and an illumination lens 35 combining the lights allowed to reach the multiple light points by the integrator rod 34 and illuminating the entire display area of the spatial light modulation element 22. The illumination optical system 23 serves to reduce unevenness in the illumination that occurs in the light source 31.

The spatial light modulation element 22 consists of for example a transmissive LCD, the polarized light transmission axis of which is aligned with the polarization direction of the illumination light emerging from the PS conversion element 33 of the illumination optical system 23. The spatial light modulation element 22 is not restricted to a transmissive LCD and can be a reflective LCD (LCoS) or DMD.

The pixel shifting optical unit 24 has the polarization switching liquid crystal element 1 of the present invention and a birefringent plate 36. In this embodiment, the polarization switching liquid crystal element 1 has TN liquid crystal as the liquid crystal material. The birefringent plate 36 consists of an anisotropic crystal such as crystal (a-$SiO_2$), lithium niobate ($LiNbO_3$), rutile ($TiO_2$), calcite ($CaCO_3$), Chilean nitrate ($NaNo_3$), and $YVO_4$, shifting pixels according to the direction of the transmission axis of the incident polarized light.

In this embodiment, the pixel shifting control circuit 29 delivers to the modulation element drive circuit 27 images corresponding to the shifted pixel positions among input image signals. The pixel shifting control circuit 29 also drives the liquid crystal cell drive circuit 28 in sync with the delivery to synchronize the image information of the spatial light modulation element 22 with the shifted pixel positions for high resolution. As disclosed in the above Patent Document 2, the pixel shifting control circuit 29 can make corrections between fields in consideration of delay in the response speed of the spatial light modulation element 22.

In this embodiment, the spatial light modulation element 22 is a transmissive LCD and the illumination optical system 23 is a telecentric system. Then, light beam emerges from the spatial light modulation element 22 at an angle of 30 degrees or smaller including peripheral light. Therefore, the polarization switching liquid crystal element 1 is placed near the spatial light modulation element 22 so that light passes through the polarization switching element 1 at an angle of 30 degree or smaller in relation to the optical axis. In this way, influence of oblique incidence from the spatial light modulation element 22 can be reduced.

The spatial light modulation element 22 consisting of a transmissive LCD used in this embodiment is described in detail hereafter.

In this embodiment, the spatial light modulation element 22 can switch the display on the entire screen simultaneously. The spatial light modulation element 22 capable of simultaneous display (modulation) has information for the entire screen at the recording capacitors of the pixels and operates the display capacitors of the pixels at a time.

On the other hand, the prior art image display apparatus uses a line-sequential scanning spatial light modulation element as described in the above Patent Document 1. The line-sequential scanning spatial light modulation element uses recording capacitors corresponding to several pixels or one line or several lines, which is advantageous in cost. In pixel shifting for higher resolutions (wobbling), as described in Patent Document 1, the polarization switching liquid crystal elements of the pixel shifting unit has to be subject to multiple polarization and driven in sequence in sync with the line-sequential scanning of the spatial light modulation element.

On the other hand, there is no need of multiple polarization of the polarization switching liquid crystal element in this embodiment using the spatial light modulation element 22 capable of simultaneous display (modulation). The drive timing of the polarization switching liquid crystal element 1 can easily be adjusted.

Furthermore, when the spatial light modulation element is a line-sequential scanning light modulation element and the polarization switching liquid crystal element is spaced from the spatial light modulation element, the relationship between the line-sequential scanning of the spatial light modulation element and the polarization/drive timing of the polarization switching liquid crystal element falls into optical confusion. Therefore, the polarization switching liquid crystal element should be placed near the spatial light modulation element; there is no freedom of positioning.

On the other hand, even if the polarization switching liquid crystal element is spaced from the spatial light modulation element 22 in this embodiment using the spatial light modulation element 22 capable of simultaneous display (modulation), there is no need of multiple polarization of the polarization switching liquid crystal element and the degree of freedom of positioning the polarization switching liquid crystal element is improved.

The above degree of freedom of positioning is particularly effective when the spatial light modulation element is a reflective LCD (LCoS). When a reflective LCD is used, a polarized beam splitter (PBS) separating the incident light from the modulated light is placed in front of the reflective LCD. When the pixel shifting unit is placed on the optical path of the modulated light separated by the PBS, the distance between the reflective LCD and the pixel shifting unit is increased.

Figure 11:
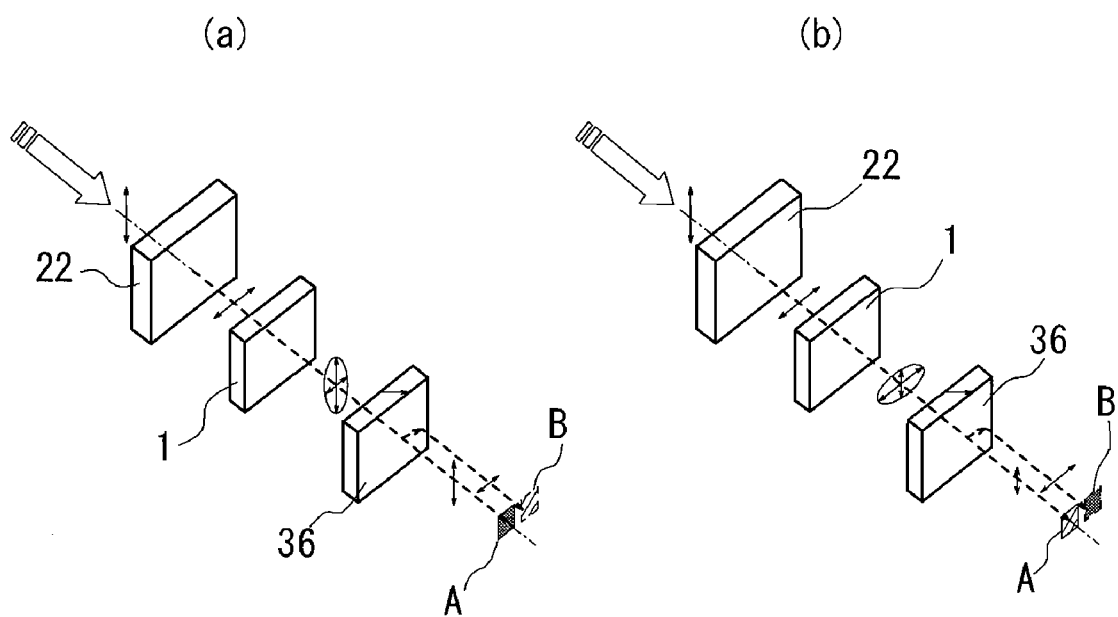
FIGS. 11 (a) and (b) are illustrations for explaining the mechanism of generation of crosstalk in two-pixel shifting.

Deterioration in the switched states caused by the polarization switching liquid crystal element 1 (see FIGS. 4 to 6), or crosstalk generated due to elliptical polarization, while a voltage/no voltage is applied to the polarization switching liquid crystal element 1 for two-pixel shifting (wobbling) in the horizontal direction is described hereafter with reference to FIG. 11 (*a*) and (*b*). No voltage is applied to the polarization switching liquid crystal element 1 in FIG. 11 (*a*) and a voltage is applied to the polarization switching liquid crystal element 1 in FIG. 11 (*b*).

In FIG. 11 (*a*) and (*b*), the spatial light modulation element 22 modulates polarized light having a vertically polarized light transmission axis to yield polarized light having a horizontally polarized light transmission axis. When no voltage is applied to the polarization switching liquid crystal element 1 as shown in FIG. 11 (*a*), the polarized light incident on the polarization switching liquid crystal element 1 is rotated ideally by 90 degrees to become polarized light having a vertically polarized light transmission axis and reach the pixel position A without being subject to horizontal pixel shifting (beam shifting) by the birefringent plate 36.

However, it is significantly difficult to realize the ideal rotation in the polarization switching liquid crystal element 1. The polarized light emerging from the polarization switching liquid crystal element 1 is elliptically polarized in practice. Therefore, the polarized light emerging from the polarization switching liquid crystal element 1 has as vector components a horizontally polarized light component and a vertically polarized light component. The horizontally polarized light component is subject to pixel shifting by the birefringent plate 36 and reaches the pixel position B. The vertically polarized light component is not subject to pixel shifting by the birefringent plate 36 and reaches the pixel position A. In this way, the light reaches both pixel positions A and B simultaneously while no voltage is applied to the polarization switching liquid crystal element 1.

As described above, the polarized light emerging from the polarization switching liquid crystal element 1 is elliptically polarized and information to be displayed originally at the pixel position A is displayed at the two pixel positions A and B according to the degree of elliptical polarization. This leads to deteriorated resolutions. Here, such a phenomenon is called crosstalk.

Similarly, when a voltage is applied to the polarization switching liquid crystal element 1, the polarized light emerging from the polarization switching liquid crystal element 1 is elliptically polarized and information to be displayed originally at the pixel position B horizontally shifted to the right is displayed at the two pixel positions A and B, causing crosstalk. When the polarization switching liquid crystal element 1 has TN liquid crystal, the degree of elliptical polarization varies depending on whether or not a voltage is applied. The degree of elliptical polarization is higher when no voltage is applied than when a voltage is applied.

The above described crosstalk has a wavelength dependency. When a single wavelength illumination light is used, the system can be optimized for that operation wavelength. When illumination light of the entire visible light range (or a specific color, R, B, or G, light) is used, the crosstalk occurs to different degrees depending on the colors and false colors as described later appear besides deteriorated resolutions.

Less crosstalk occurs when the polarization switching liquid crystal element 1 has a lower transmittance. False colors are prevented when the transmittance is low for the entire R, G, and B range. It is difficult to ensure the viewing angle (oblique incidence) property using materials having a large Δn in image display applications in which there is a great demand for liquid crystal. When the polarization switching liquid crystal element 1 is used as a pixel shifting element particularly in projectors, not used in image display applications, oblique light beams (tilted at 30 degrees or more) are at issue in few cases and a structure not affected by the oblique incidence can easily be realized.

False colors are described hereafter with reference to FIGS. 12 and 13.

FIG. 12 is an illustration for explaining an ideal pixel shifting without crosstalk. Here, an image to be displayed at a pixel position A is white and an image to be displayed at a pixel position B is black. In other words, when the R, G, and B colors are expressed by 8-bit signals, an image with R=255, G=255, and B=255 is displayed at the pixel position A and an image with R=0, G=0, and B=0 is displayed at the pixel position B. The pixel positions A and B are separated for convenience of explanation. However, having a large pixel aperture rate, the pixel positions A and B partially overlap with each other in the actual pixel form.

When crosstalk occurs in the R, G, and B color lights differently, for example at R, G, and B ratios of 50:50, 80:20, and 90:10, respectively, due to elliptical polarization through the polarization switching liquid crystal element 1, the image displayed at the pixel position A appears in bluish white because of weak red and the image displayed at the pixel position B appears in reddish black because of strong red. A phenomenon called false color or coloring occurs where white or black is initially supposed. In other words, because of differences in the crosstalk rate among the R, G, and B colors, an undesired color appears.

Figure 14:
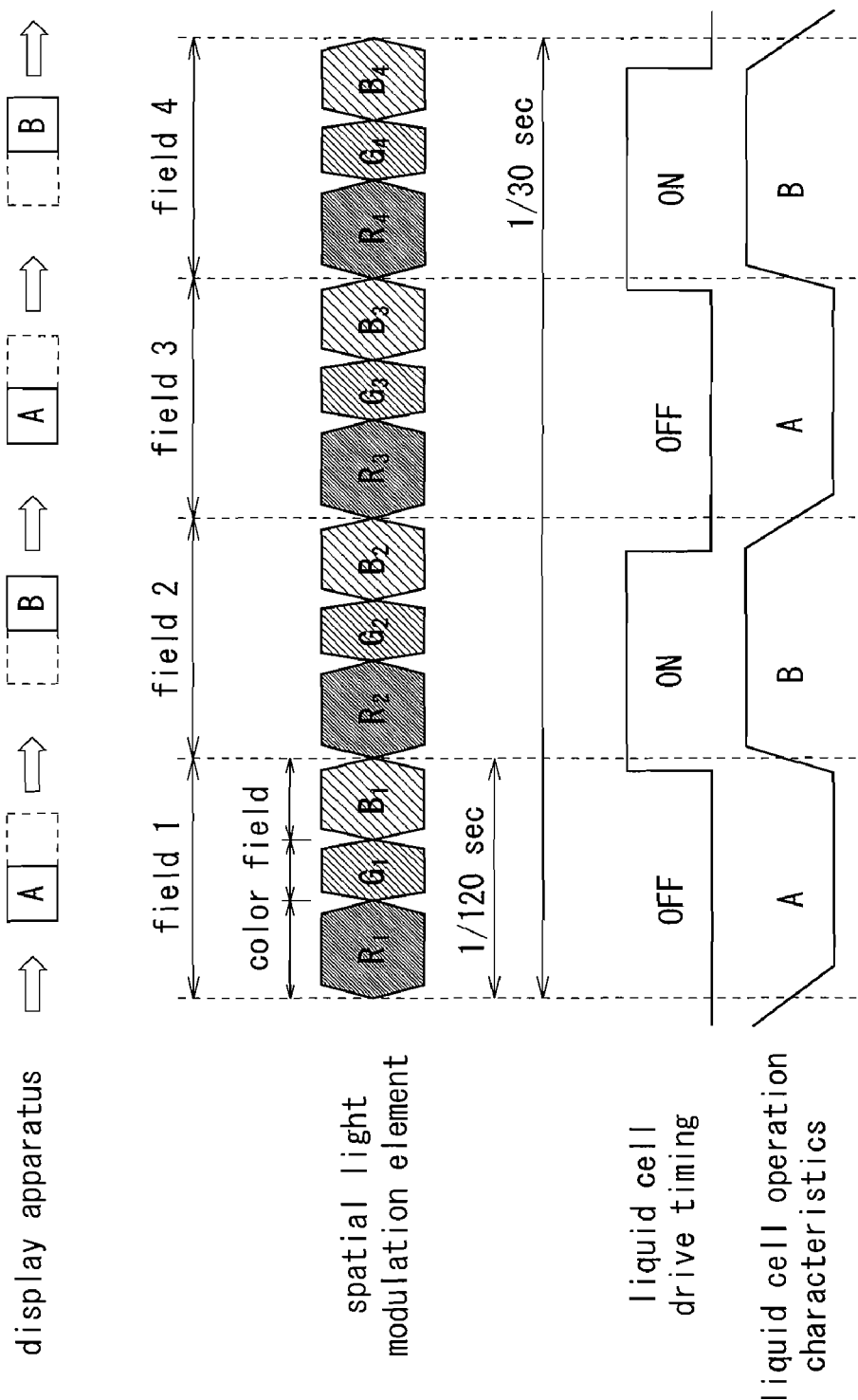
FIG. 14 is a time chart of two-pixel shifting in the color field-sequential display in the image display apparatus shown in FIG. 10.

FIG. 14 is a time chart of two-pixel shifting in the color field-sequential display in the image display apparatus shown in FIG. 10.

The spatial light modulation element 22 provides four RGB sequential displays in a field. The R, G, and B color field duration are determined in consideration of white balance based on the spectral characteristics of the light source 31. In this embodiment, a color wheel 32 is constituted so that the illumination occurs in the order of R>B>G.

A cycle of R, G, and B color fields forms a field and four fields form a frame with a frequency of 30 Hz. The two-pixel shifting occurs on a field basis. An image is displayed at the pixel position A at the first and third fields during which no voltage is applied to the polarization switching liquid crystal element 1. An image is displayed at the pixel position B at the second and fourth fields during which a voltage is applied to the polarization switching liquid crystal element 1. When input signals are interlaced, different data can be displayed between the first and second fields and the third and fourth fields at 60 Hz.

When the polarization switching liquid crystal element 1 has TN liquid crystal, the response speed varies between when a voltage is applied and when a voltage is removed. Crosstalk and consequently false colors easily occur during the polarization switching particularly upon the removal of a voltage. In order to reduce such false colors, the polarization switching liquid crystal element 1 is turned off earlier for the change from the pixel position B to the pixel position A in consideration of the response speed.

Here, the mechanism of generation of false colors according to response of the polarization switching liquid crystal element 1 is described in detail. When the polarization switching liquid crystal element 1 is turned on in the time period of lights B1 and R2 between the fields 1 and 2, the rotation of the polarization starts. Light reaches both the pixel position A and the pixel position B from the start to end of the rotation of the polarization, causing crosstalk. Particularly, crosstalk due to the response property of the polarization switching liquid crystal element 1 occurs in the colors R and B, not in the color G. Therefore, pixel information (including white balance) at each pixel position is different from what is expected, causing false colors.

On the other hand, when the spatial light modulation element 22 is of a line-sequential scanning type and the polarization switching liquid crystal element 1 is driven according to the line-sequential scanning, the polarization switching liquid crystal element 1 is turned off at different times between the upper and lower parts of the screen. This causes different tendencies in false colors and, consequently, uneven false colors on the screen. When the polarization switching liquid crystal element 1 is polarized in order to reduce unevenness in the false colors on the screen, uneven false colors occur in the polarized pattern.

On the other hand, when the spatial light modulation element 22 is of a simultaneous display type as in this embodiment, false colors occur evenly throughout the screen if any. Then, the observed image does not have uneven false color parts, which effectively reduce unpleasantness.

Figure 15:
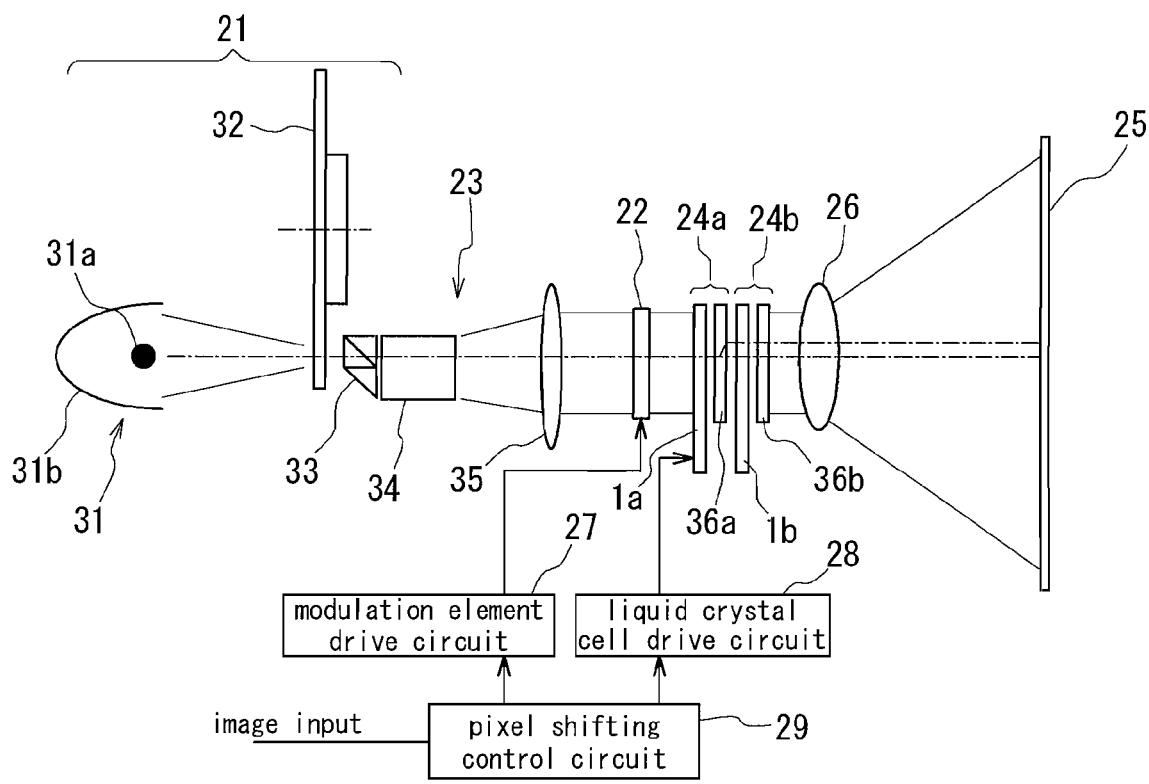
FIG. 15 is a schematic illustration showing the structure of Embodiment 2 of the image display apparatus of the present invention.

FIG. 15 is a schematic illustration showing the structure of Embodiment 2 of the image display apparatus of the present invention. The image display apparatus of this embodiment uses two sets of pixel shifting optical units 24*a* and 24*b* for four-pixel shifting in the horizontal and vertical directions in the image display apparatus of Embodiment 1.

The pixel shifting optical units 24*a* and 24*b* have polarization switching liquid crystal elements 1*a* and 1*b* of the present invention and birefringent plates 36*a* and 36*b*, respectively. The birefringent plates 36*a* and 36*b* are arranged with their light beam shifting directions being orthogonal to each other. The other structure is the same as of Embodiment 1. Therefore, the elements having the same functions are referred to by the same reference numbers and their explanation is omitted. Operation of four-pixel shifting is well known; therefore, it is not explained here.

Figure 16:
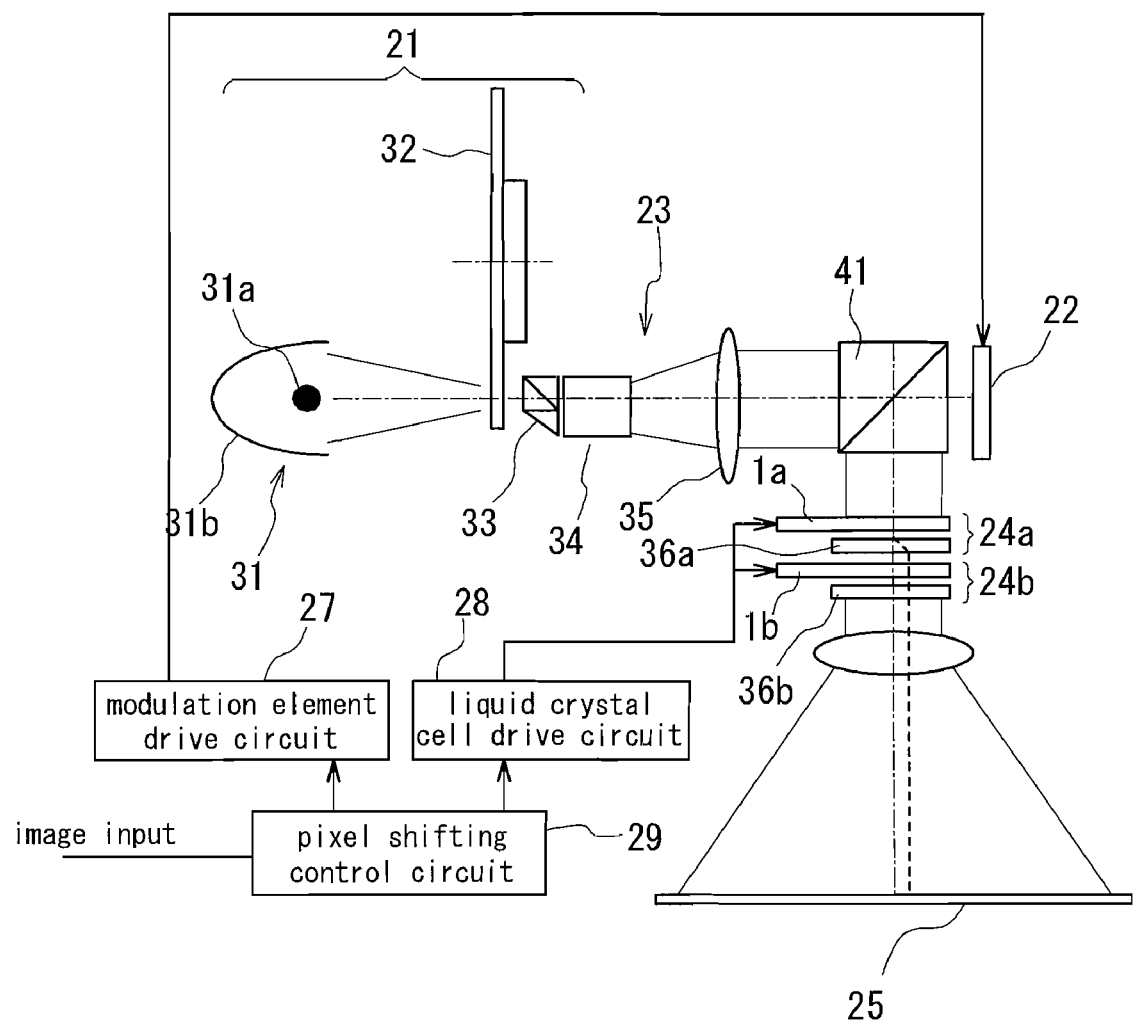
FIG. 16 is a schematic illustration showing the structure of Embodiment 3 of the image display apparatus of the present invention.

FIG. 16 is a schematic illustration showing the structure of Embodiment 3 of the image display apparatus of the present invention. The image display apparatus of this embodiment has the simultaneous display spatial light modulation element 22 consisting of a reflective LCD. Therefore, a PBS 41 is placed between the illumination optical system 23 and the spatial light modulation element 22. Illumination light incident on the spatial light modulation element 22 and reflected light modulated by the spatial light modulation element 22 are polarized and separated by the PBS41. The modulated light separated by the PBS 41 reaches the pixel shifting units 24*a* and 24*b*.

This embodiment uses the spatial light modulation element 22 of a reflective type. Therefore, the optical path between the spatial light modulation element 22 and the polarization switching liquid crystal element 1*a* constituting the optical unit 24*a* is extended. However, the spatial light modulation element 22 is of a simultaneous display type and the polarization switching liquid crystal element 1*a* does not need to be polarized. The degree of freedom of positioning the polarization switching liquid crystal element 1*a* is improved as described above.

Figure 17:
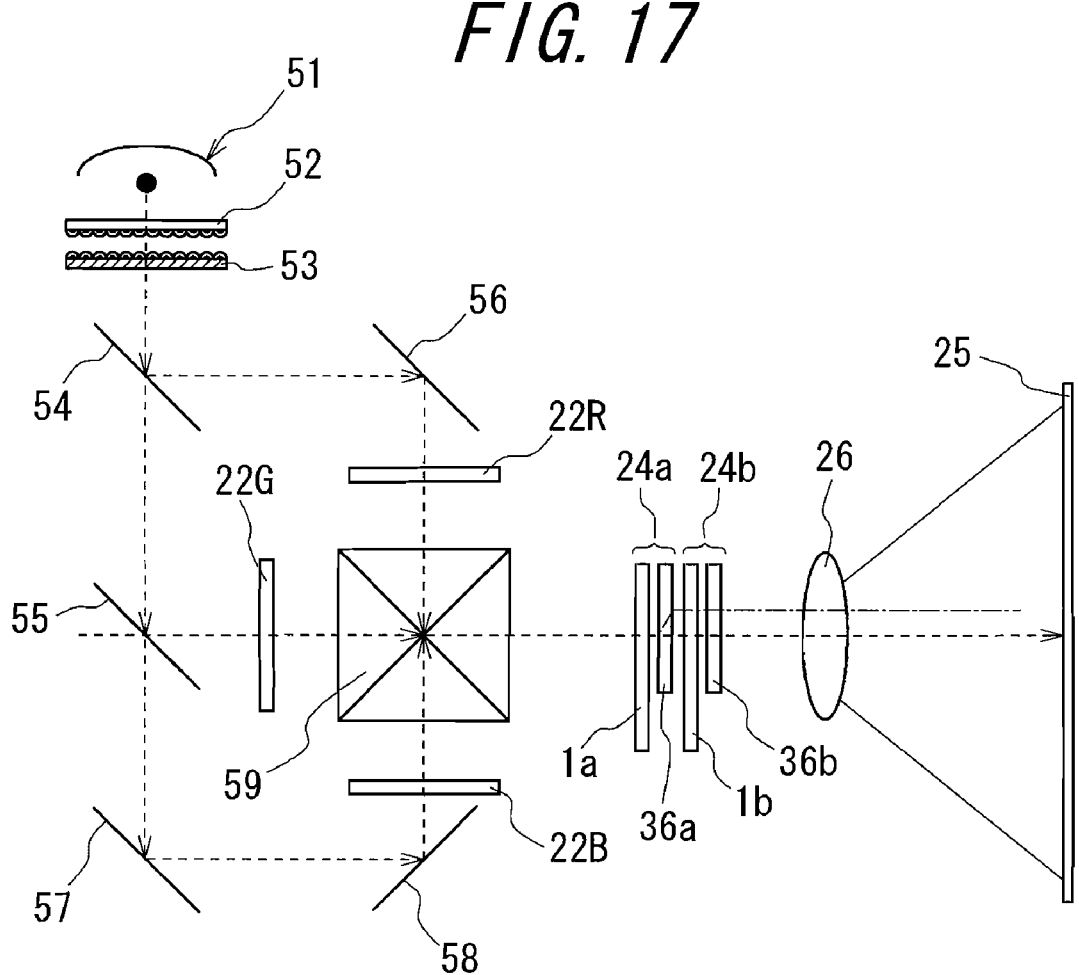
FIG. 17 is a schematic illustration showing the structure of Embodiment 4 of the image display apparatus of the present invention.

FIG. 17 is a schematic illustration showing the structure of Embodiment 4 of the image display apparatus of the present invention. This embodiment is a three-plate image display apparatus having three spatial light modulation elements 22R, 22G, and 22B each consisting of a transmissive LCD in which two sets of pixel shifting optical units 24*a* and 24*b* having the polarization switching liquid crystal elements 1*a* and 1*b* of the present invention are used for four-pixel shifting in the horizontal and vertical directions as in Embodiment 2.

In FIG. 17, illumination light from a white light source 51 is allowed to reach multiple light points by a fly's eye lens 52 for reducing unevenness in illumination on the spatial light modulation elements 22R, 22G, and 22B and converted to a specific polarized light by a PS conversion element 53 consisting of multiple PBSs.

R light in the illumination light emerging from the PS conversion element 53 is separated by a dichroic mirror 54, Then, G and B lights are separated by a dichroic mirror 55.

The R light is incident on the spatial modulation element 22R via a mirror 56 to be modulated. The G light is incident on the spatial modulation element 22G to be modulated. The B light is incident the spatial modulation element 22B via mirrors 57 and 58 to be modulated.

The R, G, and B lights modulated by the spatial light modulation elements 22R, 22G, and 22B, respectively, are combined by a color combining prism 59. The combined R, G, and B lights are subject to four-pixel shifting in the horizontal and vertical directions through the two sets of pixel shifting optical units 24a and 24b and projected on the screen 25 by the projection optical system 26 as in Embodiment 2.

Here, when the polarization switching liquid crystal element constituting a pixel shifting optical unit has a wavelength-dependent polarization ratio as in the prior art, this three-plate system is subject to different degrees of crosstalk and consequently false colors for different colors. However, in this embodiment, the polarization switching liquid crystal elements 1a and 1b of the present invention described with reference to FIGS. 1 to 9 constitute the pixel shifting optical units 24a and 24b. Therefore, a high resolution three-plate image display apparatus with reduced false colors can be realized.

Figure 18:
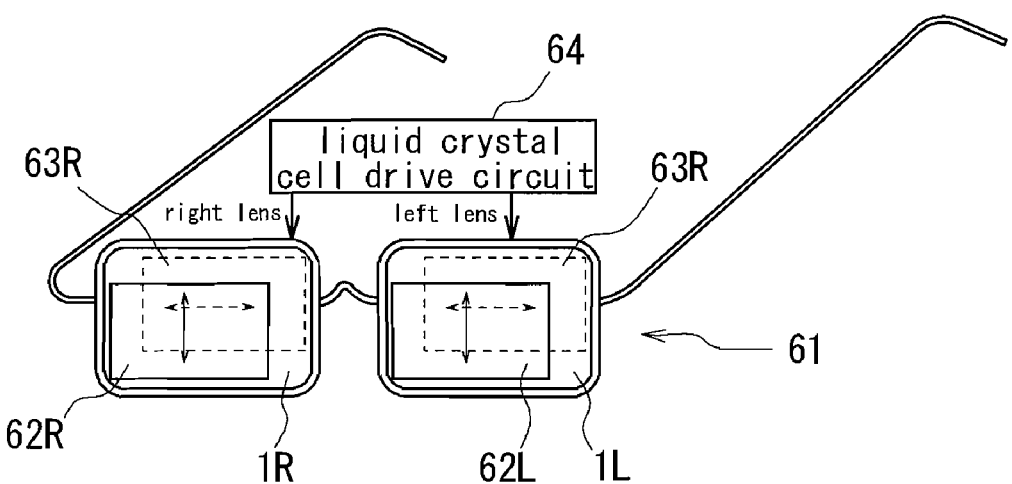
FIG. 18 is a schematic illustration showing the structure of 3D glasses using the polarization switching liquid crystal element of the present invention.

FIG. 18 is a schematic illustration showing the structure of 3D glasses using the polarization switching liquid crystal element of the present invention.

The 3D glasses use the polarization switching liquid crystal element as a shutter. The right and left lenses of the 3D glasses 61 have the polarization switching liquid crystal elements 1R and 1R of the present invention described with reference to FIGS. 1 to 9 with polarization plates 62R and 62L having a vertically polarized light transmission axis on their outer sides and polarization plates 63R and 63L having a horizontally polarized light transmission axis on their inner sides. A liquid crystal cell drive circuit 64 drives the polarization switching liquid crystal elements 1R and 1L alternately to make them transmissive alternately. In other words, two states, in one of which the right lens is transmissive and the left lens is not transmissive and in the other of which the right lens is not transmissive and the left lens is transmissive, appear alternately.

When the above 3D glasses are used to observe an image consisting of right and left eye images displayed alternately, the polarization switching liquid crystal elements 1R and 1L are driven alternately by the liquid crystal cell drive circuit 64 in sync with the switching of display of the right and left eye images, whereby a 3D image can be observed.

The switching speed between the right eye liquid crystal shutter and the left eye liquid crystal shutter is important for the above 3D glasses. It is desirable that the right and left liquid crystal shutters response at a high speed in conjunction with the switching of the right and left display images. To this end, it is effective that the liquid crystal cell has a small thickness as described above. This results in the shutter having a wavelength-dependent light shielding rate (transmittance). Some color may not be shielded to effectively separate the right and left images. For example, the left eye image leaks into the right eye image (which can also be crosstalk), impairing a spatial effect in the 3D observation.

In this embodiment, the right and left liquid crystal shutters consist of the polarization switching liquid crystal element of the present invention described with reference to FIGS. 1 to 9. The liquid crystal shutter can operate at a high response speed while the leakage (crosstalk) between the right and left images due to the wavelength-dependent shielding rate of the liquid crystal shutter is minimized, whereby reduction in the spatial effect in 3D observation can be suppressed.

The present invention is not restricted to the above embodiments and various modifications and changes can be made. For example, the polarization switching liquid crystal element of the present invention can be used extensively not only in projectors and 3D glasses but also in image display apparatuses using microdisplay such as electronic view finders (EVFs) and head-mounted displays (HMD) and optical shutters that selectively transmit or shield light and in pixel shifting image forming apparatuses using pixel shifting units.

What is claimed is:

1. A polarization switching liquid crystal element having TN liquid crystal retained between two transparent substrates for transmitting at least visible polarized light with the polarized light transmission axis selectively rotated by 90 degrees when a voltage is selectively applied to said TN liquid crystal, wherein a phase difference u of said TN liquid crystal is defined by the following equation:

$$u = 2 \times \Delta n \times d / \lambda$$

where $\Delta n$ is the refractive index anisotropy of said TN liquid crystal, d is the thickness of said TN liquid crystal, and $\lambda$ is the wavelength of said polarized light and a transmittance T of said polarization switching liquid crystal element measured with polarization plates on the incident and outgoing sides is defined by the following equation:

$$T = (1/2) \times \sin^2\{\pi(1+u^2)^{1/2}/2\}/(1+u^2), \text{ and}$$

wherein the phase difference u includes a value 1.7 and the transmittance T is 0.1 or lower when the $\lambda$ ranges from 400 nm to 700 nm.

2. The polarization switching liquid crystal element according to claim 1, wherein the thickness d of said TN liquid crystal is 4 μm or smaller.

3. An image display apparatus having a polarization switching liquid crystal element, comprising:
a visible light source emitting at least visible light;
polarization conversion means for converting the visible light from said visible light source to a specific polarized light;
spatial light modulation means for modulating the polarized light from said polarization conversion means according to image information;
pixel shifting means for shifting pixels having said polarization switching liquid crystal element and a birefringent element, pixel-shifting of the modulated light from said spatial light modulation means being performed by selectively applying a voltage to said polarization switching liquid crystal element; and
display optical means for displaying the modulated light having passed through said pixel shifting means, wherein
said polarization switching liquid crystal element has TN liquid crystal retained between two transparent substrates for transmitting at least visible polarized light with the polarized light transmission axis selectively rotated by 90 degrees when a voltage is selectively applied to said TN liquid crystal, and wherein:
a phase difference u of said TN liquid crystal is defined by the following equation:

$$u = 2 \times \Delta n \times d / \lambda$$

where $\Delta n$ is the refractive index anisotropy of said TN liquid crystal, d is the thickness of said TN liquid crystal, and $\lambda$ is the wavelength of said polarized light, and a transmittance T of said polarization switching liquid crystal element measured with polarization plates on the incident and outgoing sides is defined by the following equation:

$$T=(1/2)\times\sin^2\{\pi(1+u^2)^{1/2}/2\}/(1+u^2), \text{ and}$$

wherein the phase difference u includes a value 1.7 and the transmittance T is 0.1 or lower when the λ ranges from 400 nm to 700 nm.

4. The image display apparatus according to claim 3, wherein said visible light source emits R, G, and B color lights to said spatial light modulation means in field sequence; and said spatial light modulation means modulates image information in sequence in correspondence with each of the color lights from said visible light source.

5. The image display apparatus according to claim 4, wherein light beam transmits said polarization switching liquid crystal element at an inclination angle of 30 degrees or smaller.

6. The image display apparatus according to claim 5, wherein the thickness d of said TN liquid crystal of said polarization switching liquid crystal element is 4 μm or smaller.

7. The image display apparatus according to claim 4, wherein the thickness d of said TN liquid crystal of said polarization switching liquid crystal element is 4 μm or smaller.

8. The image display apparatus according to claim 4, wherein said spatial light modulation means switches image information on the entire screen simultaneously in correspondence with each of the color lights from said visible light source.

9. The image display apparatus according to claim 8, wherein light beam transmits said polarization switching liquid crystal element at an inclination angle of 30 degrees or smaller.

10. The image display apparatus according to claim 9, wherein the thickness d of said TN liquid crystal of said polarization switching liquid crystal element is 4 μm or smaller.

11. The image display apparatus according to claim 8, wherein the thickness d of said TN liquid crystal of said polarization switching liquid crystal element is 4 μm or smaller.

12. The image display apparatus according to claim 3, wherein light beam transmits said polarization switching liquid crystal element at an inclination angle of 30 degrees or smaller.

13. The image display apparatus according to claim 12, wherein the thickness d of said TN liquid crystal of said polarization switching liquid crystal element is 4 μm or smaller.

14. The image display apparatus according to claim 3, wherein the thickness d of said TN liquid crystal of said polarization switching liquid crystal element is 4 μm or smaller.

* * * * *